United States Patent [19]

Shimatake et al.

[11] 4,273,504
[45] Jun. 16, 1981

[54] INDUSTRIAL ROBOT SYSTEM CAPABLE OF PRESSURE APPLIED MACHINING OPERATIONS

[75] Inventors: Hirokazu Shimatake, Yamato; Kenzo Natsume, Zama; Takeshi Kojima, Saitama; Shuichi Ogawa, Tokyo; Ryuichi Nara, Tokyo; Shigeru Uchida, Tokyo; Haruyoshi Takagishi, Yamato, all of Japan

[73] Assignee: Nissan Motor Company, Limited, Yokohama, Japan

[21] Appl. No.: 41,068

[22] Filed: May 21, 1979

[30] Foreign Application Priority Data

May 22, 1978 [JP] Japan .................................. 53-60727

[51] Int. Cl.³ .............................................. B25J 9/00
[52] U.S. Cl. .................................. 414/728; 414/718; 414/730; 414/738
[58] Field of Search .................... 414/4, 5, 591, 718, 414/728, 730, 738; 364/117, 900

[56] References Cited

U.S. PATENT DOCUMENTS

| | | | |
|---|---|---|---|
| 2,679,940 | 6/1954 | Goertz | 414/728 X |
| 3,255,893 | 6/1966 | Hainer et al. | 414/728 |
| 3,272,347 | 9/1966 | Lemelson | 414/728 |
| 3,337,071 | 8/1967 | Clark | 414/728 |
| 3,909,801 | 9/1975 | Tokura et al. | 364/117 X |

FOREIGN PATENT DOCUMENTS

1409463 10/1973 United Kingdom .
1441999 7/1976 United Kingdom .
1455782 11/1976 United Kingdom .

*Primary Examiner*—Stephen G. Kunin
*Assistant Examiner*—Terrance L. Siemens
*Attorney, Agent, or Firm*—Lowe, King, Price & Becker

[57] ABSTRACT

An industrial robot system comprises a pair of vertically spaced parallel guide rails rigidly supported from the ground, a slide member slidably mounted on the guide rails having upper and lower pivots, a robot arm structure having a housing pivoted at the upper pivot of the slide member, and an outer and inner shaft axially movable as a single piece along the longitudinal axis of said housing, the inner shaft being rotatable about the longitudinal axis. A tool holding arm is attached to the forward end of the housing for unitary axial movement with the outer shaft and for unitary rotation with the inner shaft. A fluid operated telescopic cylinder is pivotally connected between the lower pivot of the slide member and a lower end portion of the robot housing for pivoting the robot arm structure at a desired angular position.

5 Claims, 17 Drawing Figures

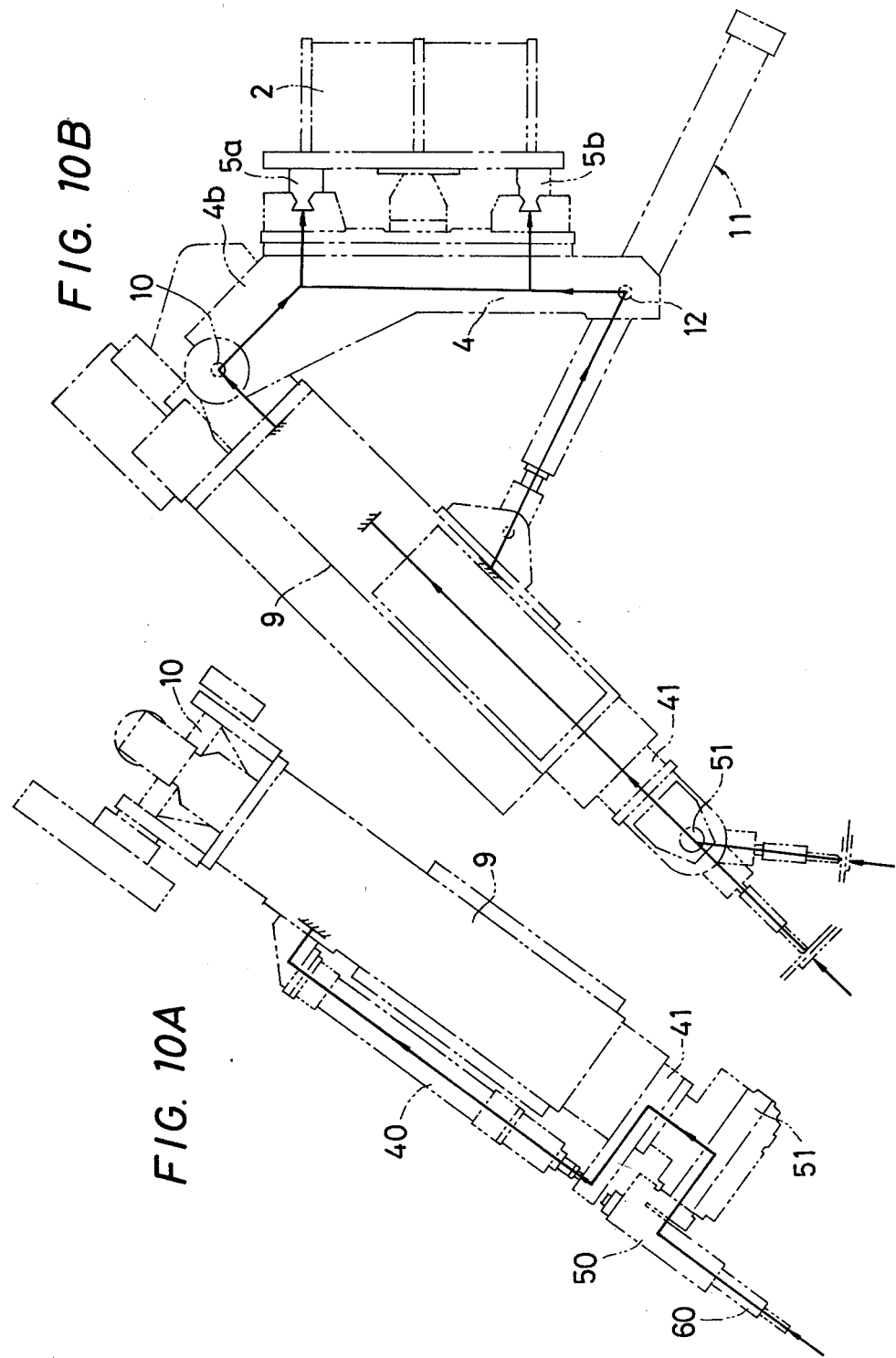

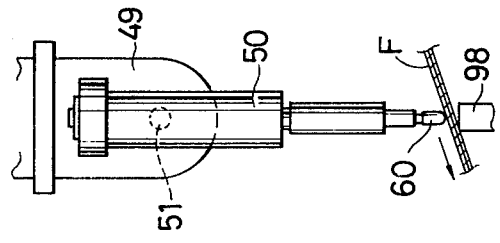
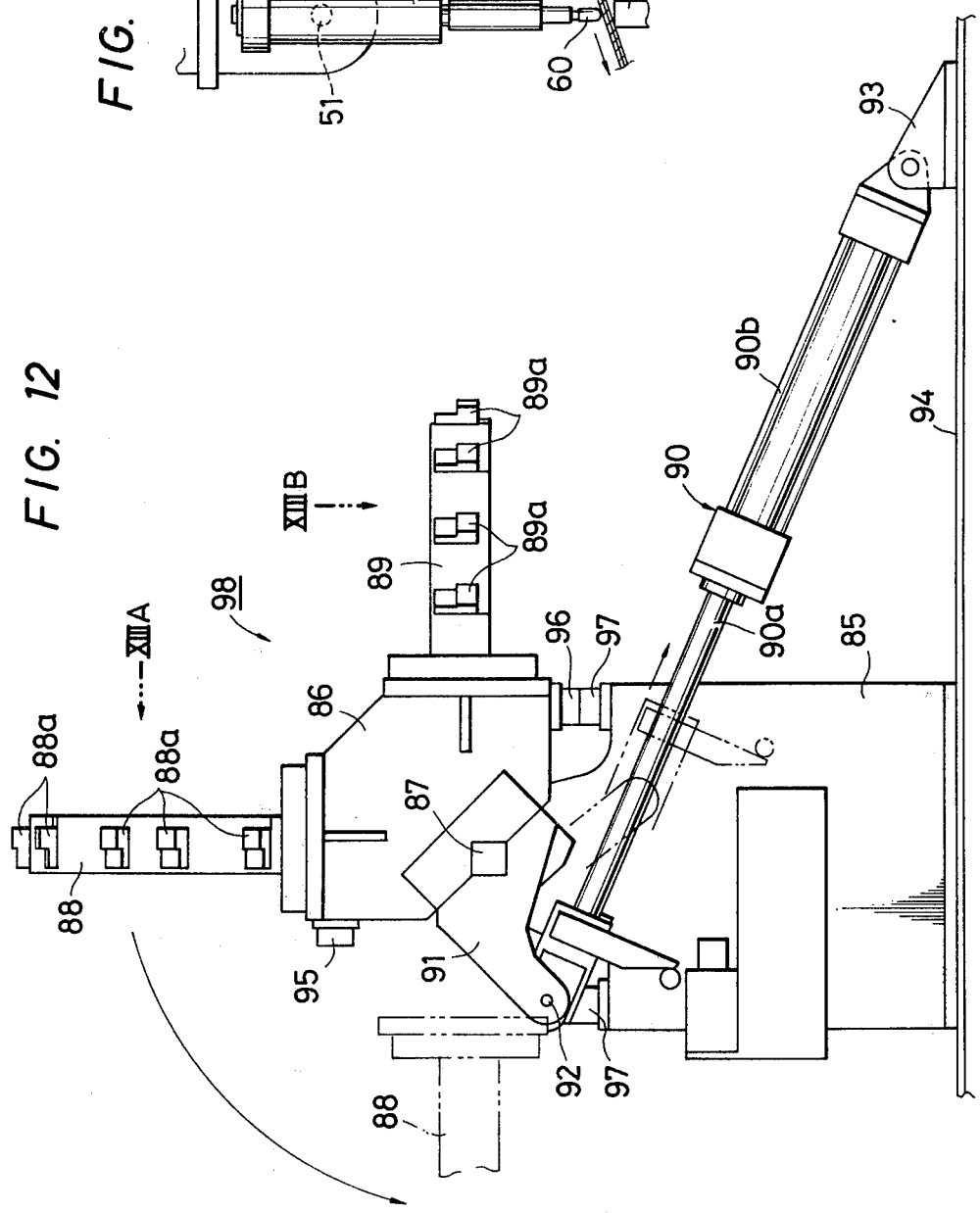

INDUSTRIAL ROBOT SYSTEM CAPABLE OF PRESSURE APPLIED MACHINING OPERATIONS

BACKGROUND OF THE INVENTION

The present invention relates to industrial robot systems, and in particular to such a robot system capable of pressure-applied machining operations, such as spot welding.

In automobile manufacturing plants, it is customary to produce a single model of cars on a single production line since there do not exit multi-purpose machine tools which make it possible to produce different models on a same production line. It is desirable however to mass-produce a variety of models of cars on a single production line in terms of efficiency, space savings and equipment cost.

Attempts have hitherto been made to employ industrial robot systems because of their capability to repeatedly position an object according to a prescribed pattern under the direction of instruction data including tool position data and operating speed.

Conventional robot systems comprise a main body installed on the ground and an arm pivoted at one end to the main body for holding a tool at the other and. In some machining operations such as spot welding, a substantial amount of force is applied to a workpiece and the resulting reaction force must be borne by the entire structure. However, the conventional robot system is not capable of bearing such reaction force and deformation tends to occur.

To avoid such deformation conventional automatic spot welding machines are provided with upper and lower arms in an X-shaped or C-shaped configuration to distribute the reaction force components between the upper and lower arms. However, large sized workpieces would require the machine to extend its arm a substantial distance from its standing position and some workpieces have an irregular surface contour. The conventional spot welding machine is not satisfactory for these spot welding operations.

SUMMARY OF THE INVENTION

Accordingly, an object of the invention is to provide an industrial robot system which is capable of withstanding a substantial amount of reaction force arising from pressure-applied machining operations.

The invention contemplates the use of a pair of vertically spaced parallel guide rails mounted on a rigid frame structure. The robot arm comprises a housing, an outer and inner shaft axially movable as a one piece with the inner shaft being rotatable about its axis, a horizontal pivot shaft rotatably connected to an end of the inner shaft for holding a working tool, and fluid operated cylinders for actuating the moving parts to take desired positions. An upper end of the robot arm is pivoted to an upper end of a slide member slidably mounted on the guide rails. A fluid operated telescoping cylinder is provided which is connected between a lower end portion of the robot arm and a lower pivot point of the slide member. The reaction force is transmitted through the longitudinal axis of the robot arm. Part of the transmitted force is applied through the upper pivot point of the slide member to the upper guide rail, while the remainder is applied through the telescoping cylinder to the lower pivot point of the slide member and thence to the lower guide rail, whereby the reaction force is transmitted to the rigid frame structure.

The forward end of the robot arm is provided with a brake or frictional means which firmly holds the horizontal pivot shaft, so that the tool holding portion is not subject to bending or deformation.

BRIEF DESCRIPTION OF THE DRAWINGS

The invention will be further described by way of example with reference to the accompanying drawings, in which:

FIGS. 10 and 10b are explanatory diagrams illustrating the route of reaction forces transmitted through the robot arm to the frame structure;

FIG. 11 is an illustration of the robot arm relative to an inclined working surface;

FIG. 12 is an end view of a backing electrode unit for spot welding;

DETAILED DESCRIPTION

Figure 1:
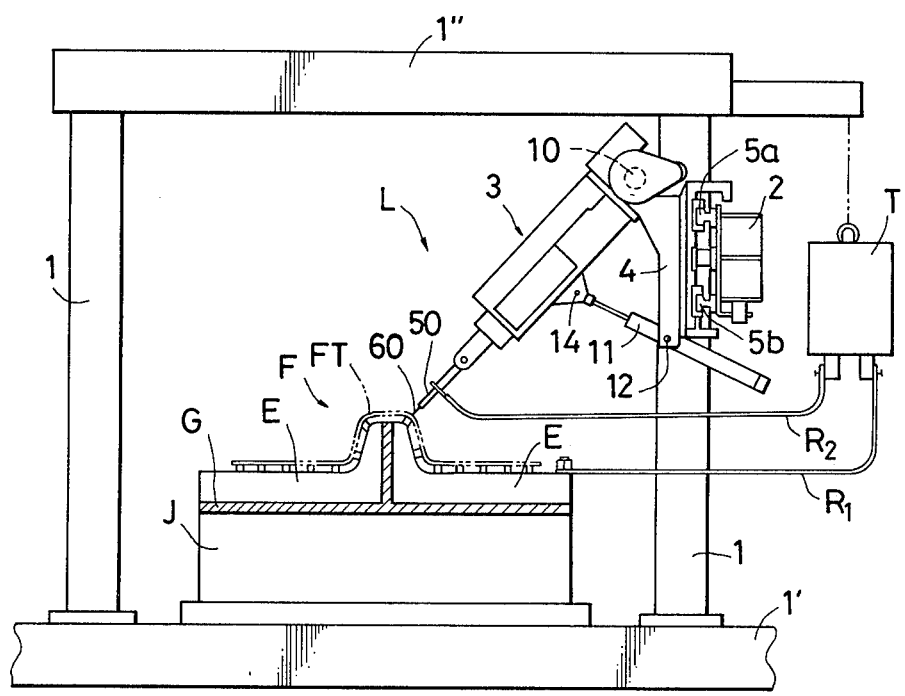
FIG. 1 is an end view of an industrial robot system of the invention.

Referring now to FIG. 1, numerals 1, 1 designate columns or guide supports erected on the floor 1' by the side of an automobile assembly line L (hereinafter referred to as line), on which a car floor F is successively placed for welding operations. The vertical supports 1, 1 are connected by a horizontal beam 1" above the floor 1'. A pair of vertically spaced parallel, upper and lower guide rails 5a and 5b is secured to a reinforced horizontal beam 2 mounted on the vertical supports 1. A slide member 4 is slidably mounted on the guide rails 5a, 5b. On an upper pivot point 10 of the slide member 4 is pivoted an upper end of a robot arm structure 3, and between a lower pivot 12 of the member 4 and a pivot 14 of the robot arm 3 is connected a fluid operated telescoping means or cylinder 11 for pivoting the robot arm 3 at a desired angular position to position a fluid-operated gun cylinder 50 on the workpiece F. The robot arm 3 is also driven along the guide rails to take optimum work positions. FT is a hump formed on the car floor F to provide a downwardly open channel and E is a backing electrode for spot welding mounted on an insulator G placed on a base J. To the backing electrode E is connected a welding cable R1 extending from a transformer T, the other cable R2 extending from the transformer to a welding gun 60 held by the gun cylinder or wrist portion 50.

Figure 2:
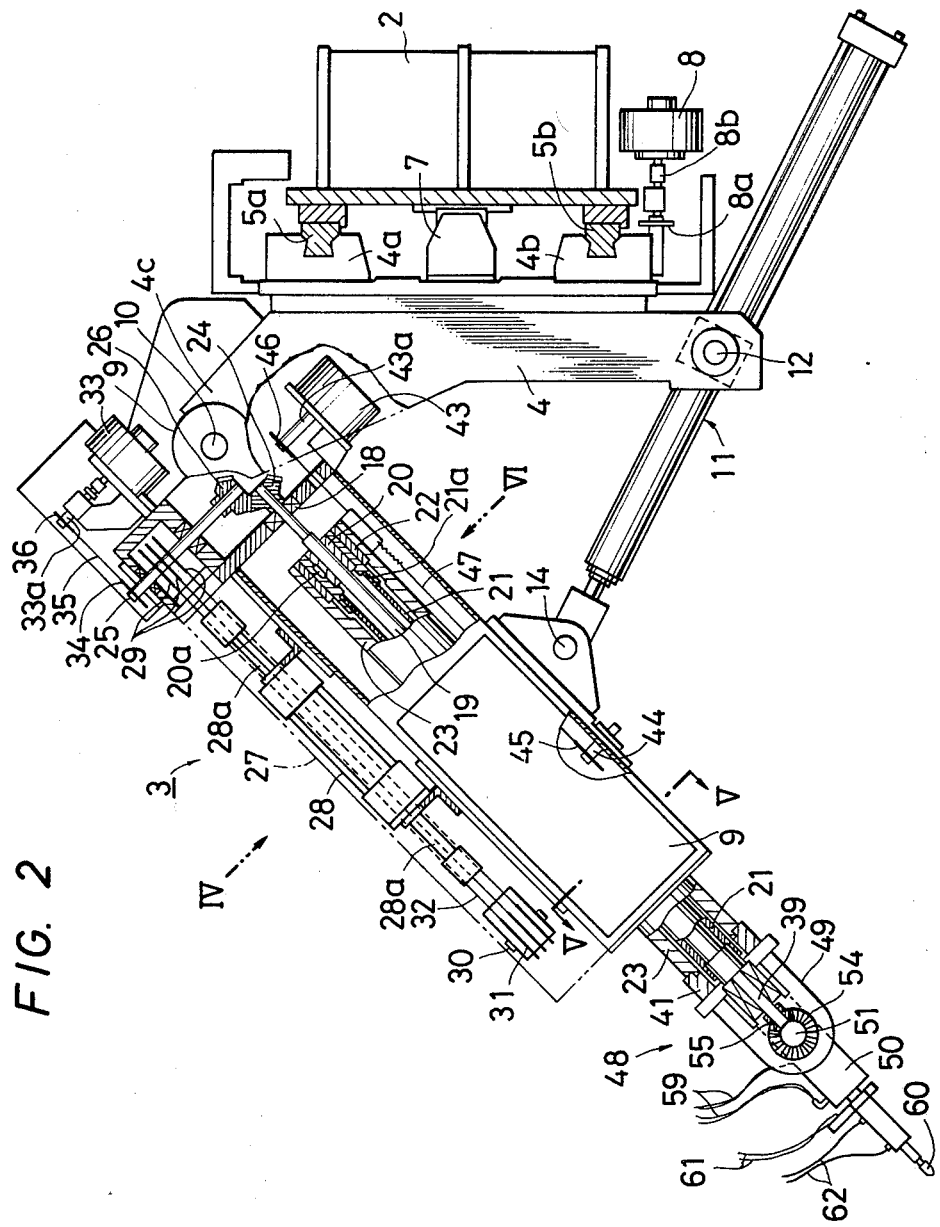
FIG. 2 is a partially broken, side elevational view of the robot arm structure of FIG. 1.
Figure 3:
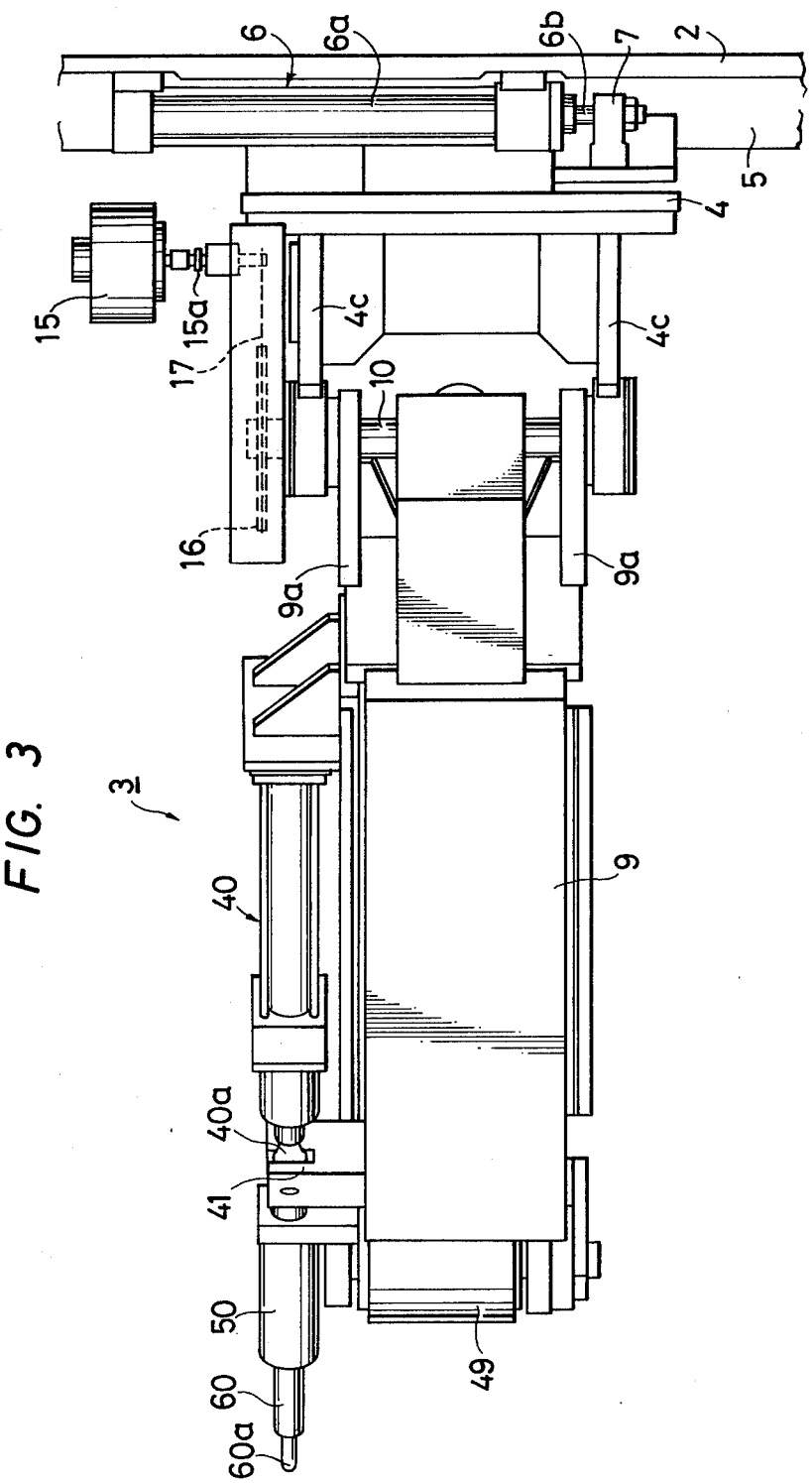
FIG. 3 is a plan view of the robot arm of FIG. 1.
Figure 4:
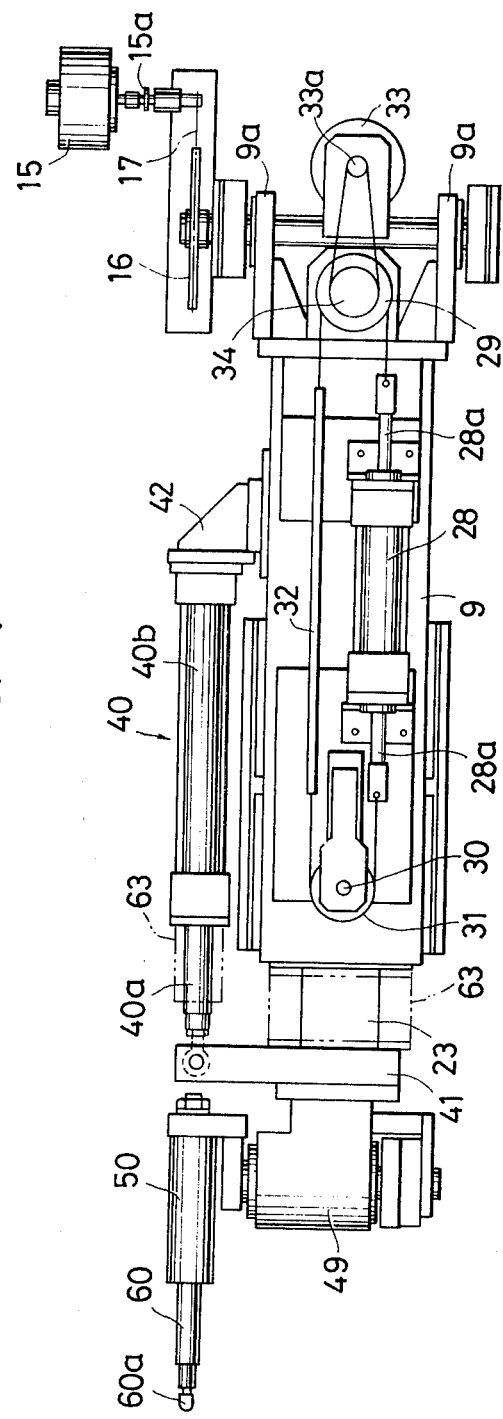
FIG. 4 is a side view of the robot arm of FIG. 2 as viewed in the direction indicated by the arrow IV of FIG. 2.

FIGS. 2 through 7 illustrate the details of the robot arm structure 3 operating as a spot welding machine. In FIGS. 2 to 4, the slide member 4 includes a pair of legs 4a, 4b slidably secured to the guide rails 5a and 5b, respectively, and a bracket 7 to which is secured the piston rod 6b of a fluid operated telescoping cylinder 6 (see FIG. 3), the cylinder housing 6a thereof being connected to the beam 2 for purposes of moving the robot arm structure 3 along the guide rails. A position translating encoder 8 (FIG. 2) is secured to the beam 2 for detecting the position of the slide member 4 by converting the horizontal displacement of the slide member 4 with respect to a reference point into the angular position of a detector shaft 8b by means of a sprocket 8 and a chain (not shown). The arrangement of the sprocket 8a and chain is of the same construction as an arrangement shown in FIG. 6 which will be described later.

The slide member 4 is also provided with a pair of yokes 4c, 4c which pivotally secure the shaft 10 on which flanges 9a, 9a of a robot arm housing 9 are mounted (FIG. 3). The angular position of the robot arm 3 is detected by a position encoder 15 having a detector shaft 15a which is coupled by means of a chain belt 17 and a sprocket 16 secured to the shaft 10.

The robot arm housing 9 includes, as shown in FIG. 2, a bearing 18 which rotatably supports a spline shaft 19, an inner cylindrical shaft 21 and an outer cylindrical shaft 23, each being mounted coaxially with the spline shaft 19. Fixed to the rearward end of the spline shaft 19 is a bevel gear 24 in mesh with another bevel gear 26 secured to a rotary shaft 25 extending at right angles to the spline shaft 19, so that the latter is driven by the rotary shaft 25. A fluid operated telescoping cylinder 28 is secured to the robot arm housing 9 and enclosed by a cover 27 in phantom lines to drive the rotary shaft 25. The cylinder 28 is provided with a pair of oppositely reciprocating piston rods 28a, each end of which is linked to each end of a chain belt 32 which is looped around a sprocket 29 fixed to the rotary shaft 25 and around a sprocket 31 rotatably mounted on a shaft 30 pivoted to the forward end of the robot arm housing 9. The reciprocating motion of the piston rods 28a in opposite directions is transmitted to the rotary shaft 25 via the chain and sprocket arrangement. Numeral 33 is a position encoder for detecting the angular position of the rotary shaft 25, that is, the angular position of the gun cylinder 50, through the rotation of a detector shaft 33a by means of a chain belt 35 in mesh with a sprocket 34 on the rotary shaft 25 and another sprocket 36 on the detector shaft 33a.

Figure 5:
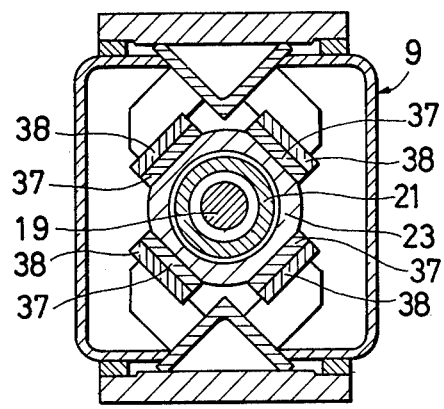
FIG. 5 is a cross-sectional view taken along the lines V—V of FIG. 2.
Figure 6:
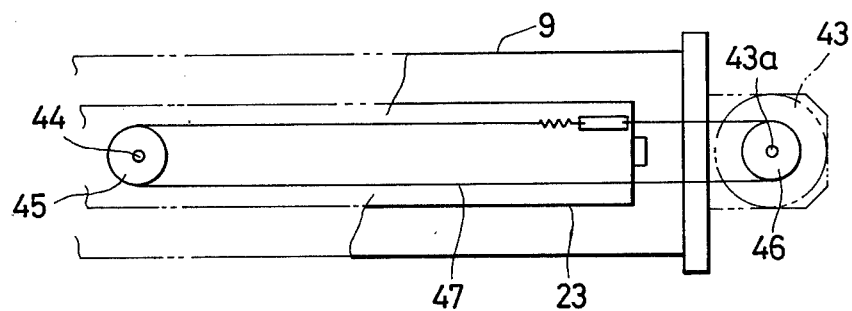
FIG. 6 is a side view of the robot arm of FIG. 2 as viewed in the direction indicated by the arrow VI of FIG. 2.

The upper end portion of the spline shaft 19 is slidably spline-connected with a hub 20 which is connected by a key 20a to a sleeve 21a of the inner shaft 21. When the spline shaft 19 turns, the inner shaft 21 also rotates inside a bushing 22 and moves in the axial direction together with the outer shaft 23. As illustrated in FIG. 5, the outer shaft 23 is provided with oppositely facing sliding members 37 spaced at 90 degrees from each other which are slidably in engagement with sliding members 38 secured to the inner walls of the robot arm housing 9, so that the outer cylinder 23 is not allowed to rotate about its longitudinal axis. The forward ends of the inner and outer shafts extend from the forward end wall of the housing 9, the end of the inner shaft 21 being secured to a spindle 39 as best seen in FIG. 2 and the end of the outer cylinder 23 secured to a connecting arm 41 fixed to a piston rod 40a of a fluid operated telescoping cylinder 40 which is shown in FIG. 4. The cylinder housing 40b of the cylinder 40 is secured to the housing 9 by a bracket 42 so that the cylinder 40 is in parallel to the longitudinal axis of the inner and outer shafts 21, 23. The cylinder 40 thus causes the connecting arm 41 and the inner and outer shafts 21, 23 to move axially for purposes of lengthening and shortening the extent of the gun cylinder 50 beyond the forward end of the housing. The axial position of the tool holder 50 is detected by a position encoder 43 which, shown in FIGS. 2 and 6, converts the axial movement of the outer shaft 23 into a rotation of a detector shaft 43a by means of a chain belt 47 looped around a sprocket 45 mounted on a shaft 44 pivoted to the housing 9 and a sprocket 46 fixed to the detector shaft 43a.

Figure 7:
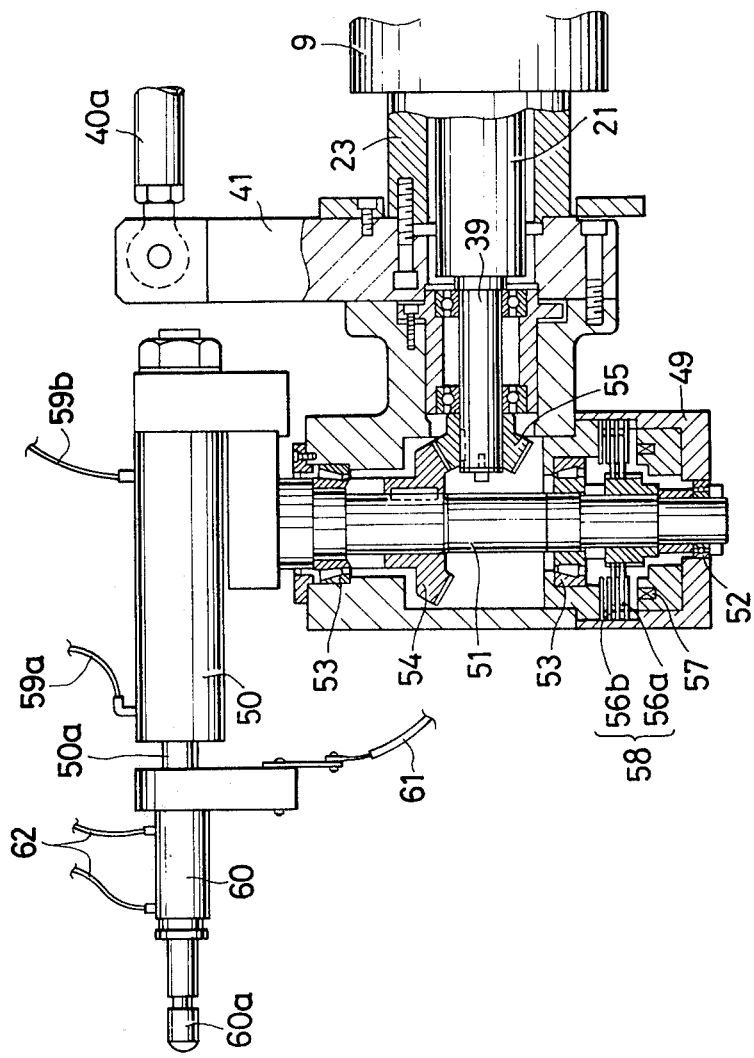
FIG. 7 is an enlarged, partially broken view of the wrist portion of the robot arm structure.

The spindle 39, which is attached to the forward end of the inner shaft 21, is enclosed by a housing 49 with its bevel gear 55 in mesh with a bevel gear 54 mounted on a horizontal pivot shaft 51 rotatably secured to the housing 49 to constitute a wrist portion 48 of the robot arm structure as best seen from FIG. 7. The tool holder 50 is secured to the pivot shaft 51, so that by rotation of the inner shaft 21 the gripper 50 is caused to swing on a vertical plane. An electromagnetic brake 58 is mounted in the housing 49 to secure the pivot shaft 51 in position by reason of friction between inner discs 56a fixed to the shaft 51 and outer discs 56 fixed to the housing 49 when an electromagnet 57 is energized. The gun cylinder 50 is provided with air supply hoses 59a and 59b to respond to controlled air pressure. To the end of the piston rod 50a is attached an electrode holder 60 for holding an electrode 60a to supply welding current to the workpiece from the transformer T via a secondary cable 61. A pair of hoses 62 is connected to the electrode 60 to supply and drain off cooling water to cool it off. Where the robot is to be used as a nut runner or a drill, the gun cylinder 50 and the electrode holder 60 are replaced as a whole with a desired tool by loosening screw 50b.

The fluid operated cylinders 6, 11, 28 and 40 are each provided with a fluid supply conduit for hydraulically control their piston rods. Numeral 63 in FIG. 4 designates a boot to prevent dust entry.

Figure 8:
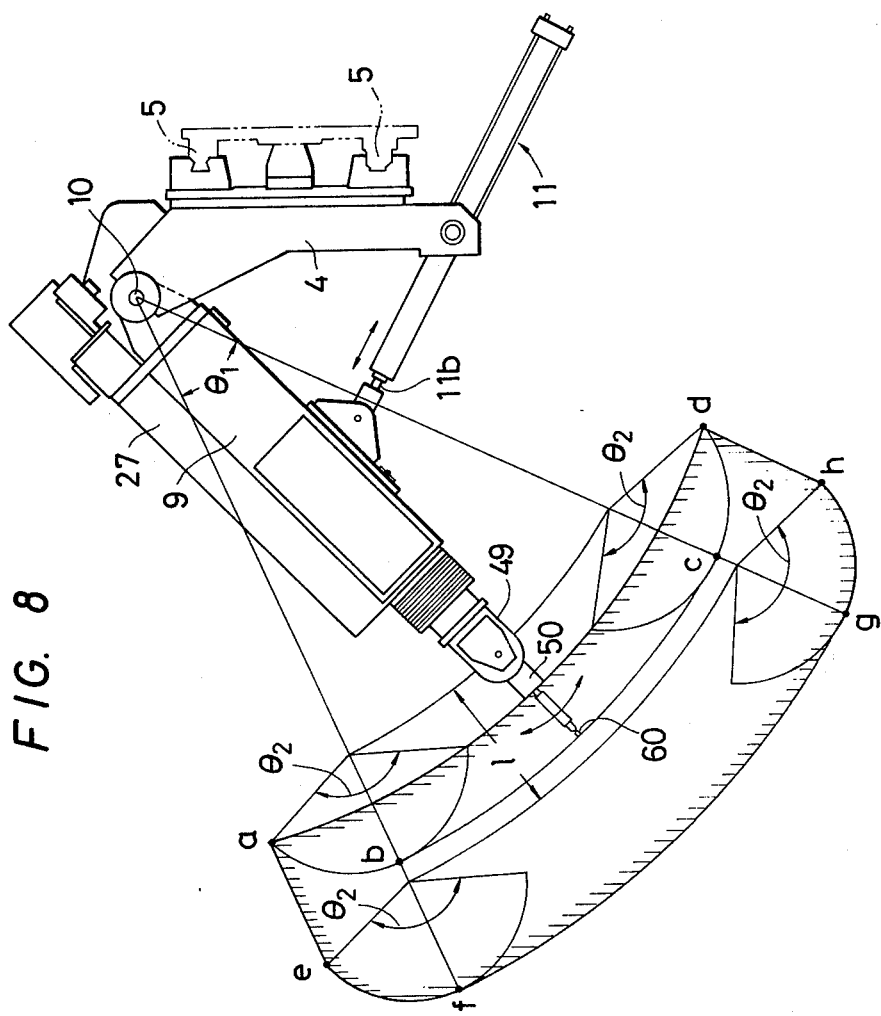
FIG. 8 is an explanatory diagram illustrating the range of working area of the tool.

The electrode 60a can thus be moved to any position by hydraulically controlling the telescoping cylinders 6, 11, 28 and 40, respectively. More specifically, the cylinder 6 (FIG. 3) extends or retract its piston rod 6b causing the slide member 4 to move along the guide rails 5a, 5b, the cylinder 11 (FIG. 2) controlling the angular position of the robot arm 3. As shown in FIG. 8, the robot arm 3 takes an angular position through an angle $\theta$ in response to an axial length of the piston rod of the cylinder 11. The cylinder 28 (FIG. 2) rotates the sprocket 29 and the rotary shaft 25 by the chain belt 32, and this rotation is communicated via the bevel gear 26, bevel gear 24, spline shaft 19, inner shaft 21, spindle 39, bevel gear 55 and bevel gear 54 to the pivot shaft 51, causing the gun cylinder 50 to swing through an angle $\theta 2$. This permits the electrode 60a to take a desired position within an area defined by points a, b, c and d. In addition, the hydraulic controlled cylinder 40 (FIGS. 3 and 4) causes the connecting arm 41 and therefore the wrist housing 49 to axially extend or retract with respect to the housing 9 to allow the electrode 60a to travel a distance l, so that it takes a desired position within an extended area defined by points a, e, f, g, h and d. At this time the inner and outer shafts 21, 23 will also axially move as a single piece with the slide members 37 sliding along the slide plates 38 of the robot housing 9, whereby the outer shaft 23 is prevented from rotating about its axis. The gun cylinder 50 provides a pressure to the electrode 60a against the surface of the workpiece F to achieve a pressure contact therebetween.

The electrode 60a can be positioned repeatedly at specified locations of the workpiece automatically with the use of a predetermined program stored in a computer memory.

Figure 9:
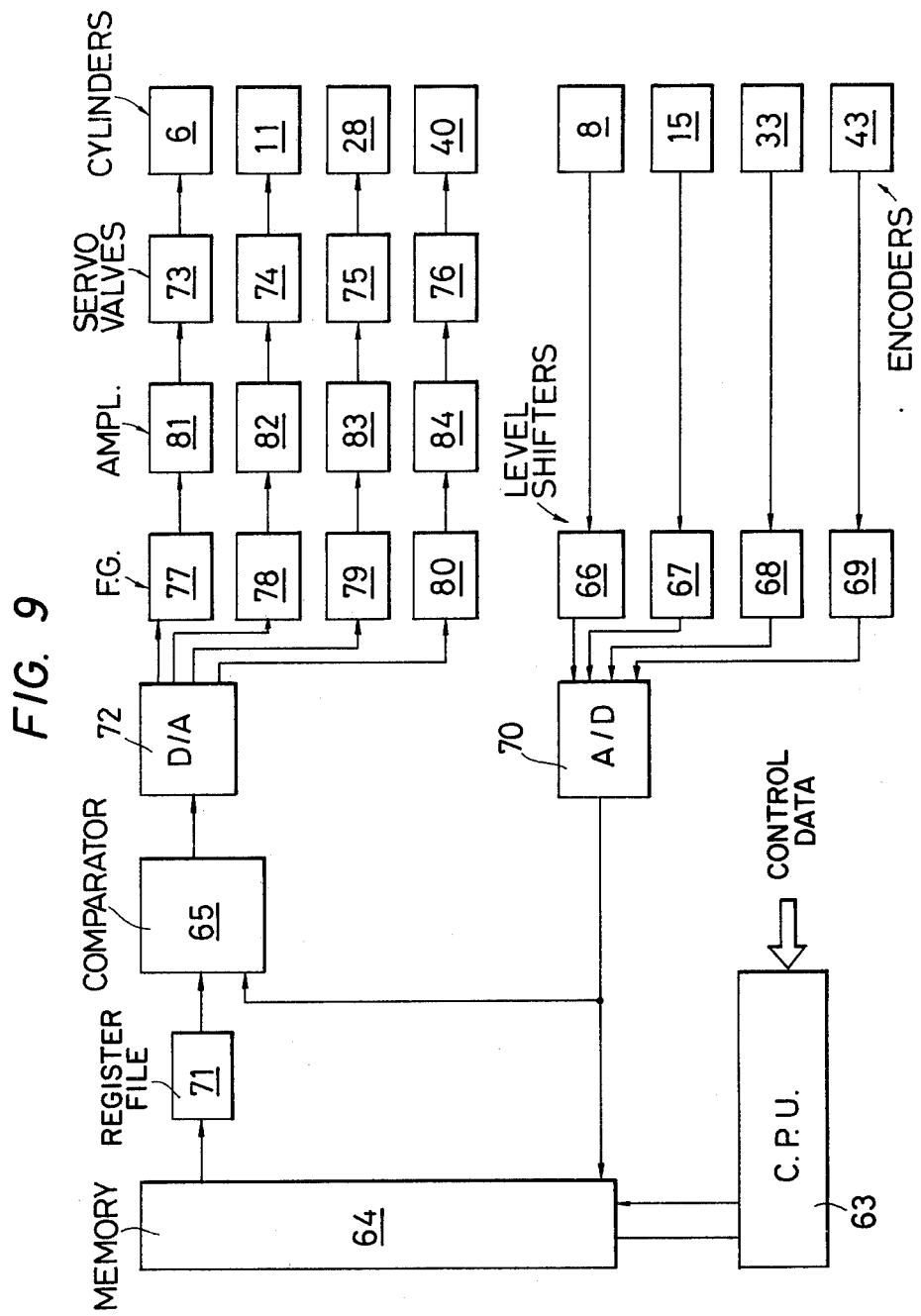
FIG. 9 is a schematic block diagram of an electronic control system of the robot system.

FIG. 9 shows a block diagram of the control unit of the robot system. The position encoders 8, 15, 33 and 43 deliver position data to the associated fluid-operated cylinders through a feedback control loop. Numeral 63 is a central processor unit to which control data S is supplied. Encoders 8, 15, 33 and 43 feed positional data to associated level shifters 66, 67, 68 and 69 respectively and thence to an analog-to-digital converter 70. The latter provides digital position signals to an input of a digital comparator 65 on the one hand and on the other to a core memory 64. The control system is initially instructed to record position data by feeding a set of input data into the core memory 64. Responsive to the input data the cylinders 6, 11, 28 and 40 are actuated resulting in the generation of actual positional data from the associated encoders. The actual position data is transmitted via associated level shifters to an analog-to-digital converter 70 and applied to the digital converter 65 wherein the input signal is compared with the data stored in a register file 71 retrieved from the memory 64. The comparator 65 feeds a signal representing the deviation of the position of the respective cylinder from the desired position and continues to feed that signal until the deviation is reduced to zero. When this occurs, digital signals from the converter 70 represent the desired positions and applied to the memory 64 to be recorded therein as a set of instruction data for a particularly working position with which the encoder signals are compared in subsequent welding operations. This process is repeated for each welding spot to record a plurality of sets of instruction data to effect a series of welding operations on the car floor F.

After the electrode 60a is automatically set into a desired position, working fluid is supplied to the gun cylinder 50 to enable it to apply pressure to the electrode 60a to the surface of the workpiece F. Electric current is then passed between the electrode 60a and a backing electrode located below the workpiece to effect spot welding. The reaction force which exerts on the electrode 60a communicated, as shown in FIGS. 10a and 10b, to the gun cylinder 50, then to the pivot shaft 51, the connecting arm 41 and the cylinder 40, to the robot arm housing 9. The reaction force so communicated to the arm 9 is further transmitted to the reinforced beam 2 through the upper pivot shaft 10 to the guide rail 5a on the one hand and through the lower pivot point 12 to the guide rail 5b on the other hand. Therefore, it is totally unnecessary to bear the reaction force by the robot arm housing 9 alone. This produces the effect of practically increasing the strength of the welding machine, making possible spot welding using a robot system which has hitherto been impossible.

Should the surface of the workpiece F is not perpendicular to the electrode 60a, as illustrated in FIG. 11, as a result of irregular contour of the workpiece, the pivot shaft 51 of the wrist portion, being firmly held in position by means of the electromagnetic brake 58, will not cause the electrode 60a to slip off the surface of the workpiece and in addition, the outer shaft 23, being prevented from rotation by means of slide members 37, will not cause the electrode 60a to rotate about its axis.

Figure 13A:
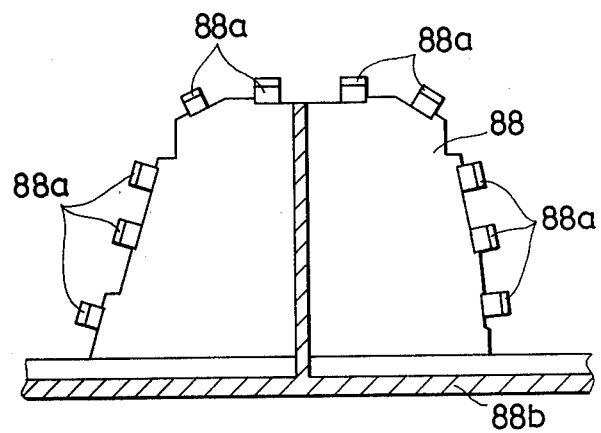
FIGS. 13a and 13b are side views of the electrode unit viewed respectively in the directions indicated by the arrows XIIIA and XIIIB of FIG. 12.
Figure 13B:
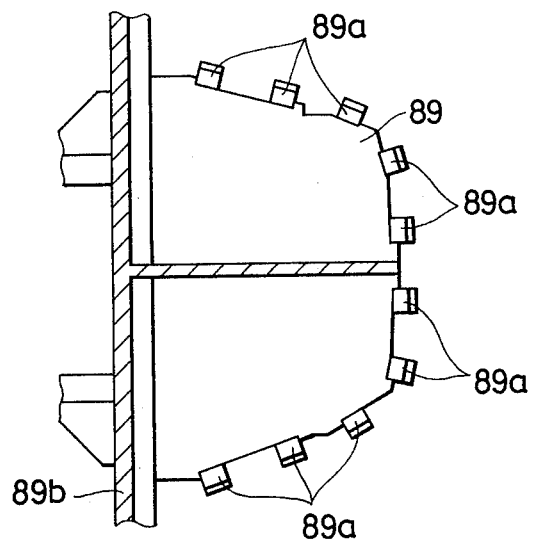

If different types of car floors are to be spot welded along the same line, the welding spots may differ in location and size between cars floors of different type. In such situation it is necessary to change the backing electrode in accordance with different car floors. FIGS. 12 and 13 show a backing electrode unit 98 designed to serve this purpose. Numeral 85 is a base and 86, an electrode support which is rotatable about a rotary shaft 87. On the support 86 are mounted angularily spaced apart backing electrodes 88 and 89 whose side configurations are shown in FIGS. 13a and 13b, respectively. The electrode support 86 is insulated from electrodes 88 and 89 by insulators 88b and 89b, respectively. These backing electrodes 88 and 89 each having particular contours to conform to the contour of different car floors, and each electrode is so inclined as to abut the lower surface contour of the channel portion of the car floor. Numeral 90 is a hydraulic cylinder having a piston rod 90a with its top end pivoted to a bracket 91 secured to shaft 87, and a cylinder housing 90b having its bottom end pivoted to a bracket 93 on a base plate 94. When the piston rod 90a extends, as shown in FIG. 12, the support 86 turns counterclockwise to bring the electrode 88 to the top position, and when the piston rod retracts, the support is turned to a position indicated by broken lines, bringing the electrode 89 to the top position. Numerals 95, 96 and 97 are spacers to determine the position of the support. As already shown in FIG. 1, one of the secondary cables from the transformer is connected to the electrode 88 or 89 and the other to the welding gun.

Figure 14:
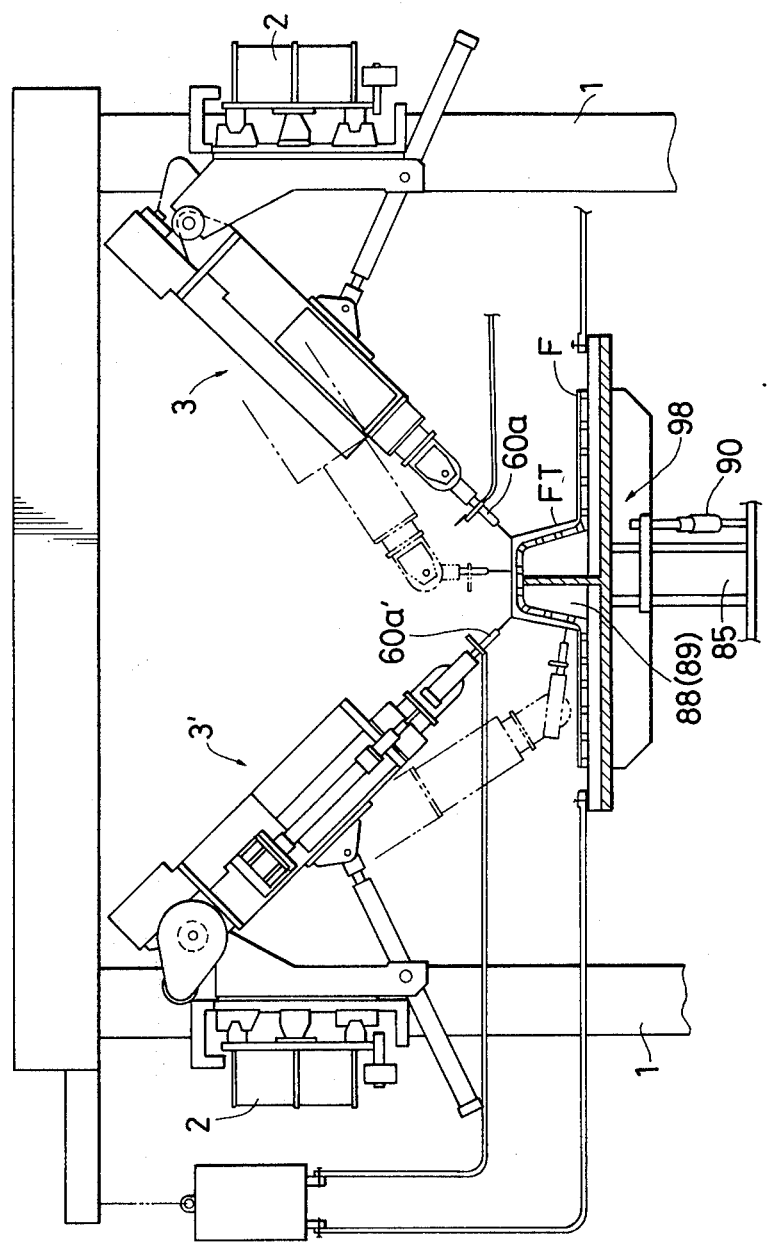
FIG. 14 is an end view of a robot system using a plurality of robot arms positioned on opposite sides of a production line.

FIG. 14 shows the electrode unit 98 installed between vertical supports 1 and two welding robot machines 3 and 3' mounted on the respective vertical supports. With the electrodes unit comprising different backing electrodes 88 and 89, and with the welding machines holding different types of electrodes 60a and 60a', respectively to meet different types of car floors, it is now possible to provide spot welding for different types of car floors on a same line.

Figure 15:
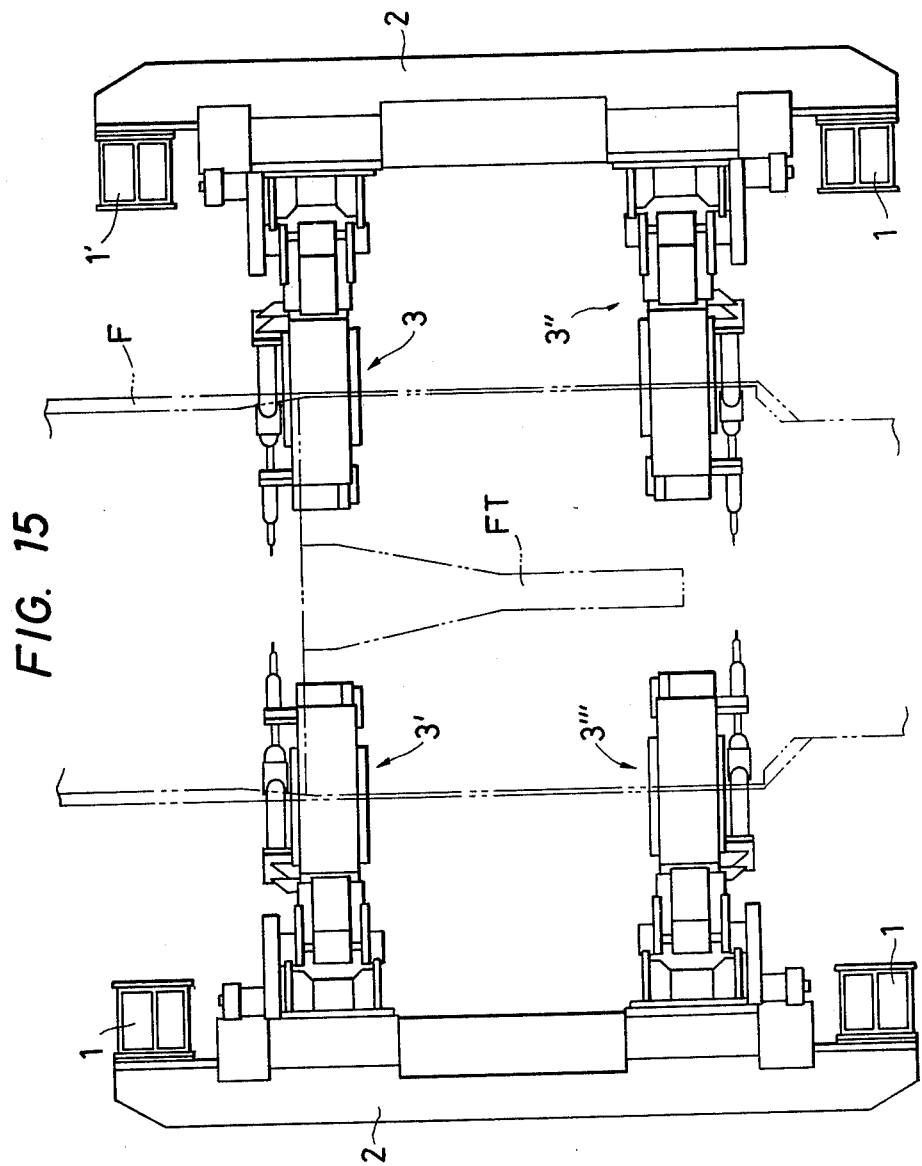
FIG. 15 is a plan view of FIG. 14.

FIG. 15 shows an example in which another pair of welding machines 3" and 3''' is employed to achieve simultaneous spot welding operations on a same car floor along its length.

Although the description above is limited to embodiments using a robot system as a welding machine, the present invention may also be used for other machining operations, simply by replacing the welding gun with a desired tool. It is also feasible to construct the guide rails directly on the ground so that the reaction force may be borne by the ground thereby further increasing the strength of the equipment.

As has been described in detail, the industrial robot of the invention is capable of setting its attached work tool at a plurality of predetermined positions, and therefore can be used as a multi-purpose machine tool to handle workpieces of varying shapes and sizes on the same line. Because of its construction permitting fixed rails to bear the reaction force exerted on the work tool, any deformation or damage of any portion of the robot can be prevented.

What is claimed is:

1. An industrial robot system comprising:
   a pair of vertically spaced parallel upper and lower guide rails;
   means for supporting said guide rails a distance from the ground;
   a slide member mounted slidably on said guide rails;
   means for moving said slide member along said guide rails;
   a robot arm structure having a housing pivotally mounted at an upper end portion thereof on an upper pivot point of said slide member adjacent to said upper guide rail, an outer cylindrical shaft mounted movably in said housing along the longitudinal axis thereof, an inner shaft mounted in said outer shaft and rotatable about said longitudinal axis and axially movable with said outer shaft, first fluid operated telescopic means secured to said housing for axially moving said outer and inner shafts, second fluid operated means for rotating said inner shaft, and a tool holding wrist portion for holding a tool, said wrist portion being axially movable with the axial movement of said outer and inner shafts and vertically swingable with the rotation of said inner shaft; and
   third fluid operated telescopic means pivotally connected between a lower pivot point of said slide member adjacent to said lower guide rail and a lower end portion of said housing for pivoting said robot arm structure at a desired angular position.

2. An industrial robot system as claimed in claim 1, wherein said wrist portion includes a housing connected to said outer shaft, a tool holding arm rotatable about a horizontal axis with the rotation of said inner shaft and means for transmitting the rotational movement of said inner shaft to a rotational movement of said tool holding arm.

3. An industrial robot system as claimed in claim 1 or 2, further comprising means for applying a brake to said tool holding arm.

4. An industrial robot system as claimed in claim 1, wherein said supporting means comprises a framed structure having a pair of vertical supports secured at one end to the ground and a horizontal beam extending between the other ends of said vertical supports to define a working area in which a workpiece is to be placed.

5. An industrial robot system as claimed in claim 1, wherein said housing includes a pair of opposed first slide members secured to the housing, and wherein said outer shaft includes a pair of second slide members respectively in abutment contact with said first slide members.